Aug. 4, 1959　　　　R. J. WAGNER　　　　2,897,678
FLEXIBLE SEAL AND PIVOT
Filed Sept. 15, 1954
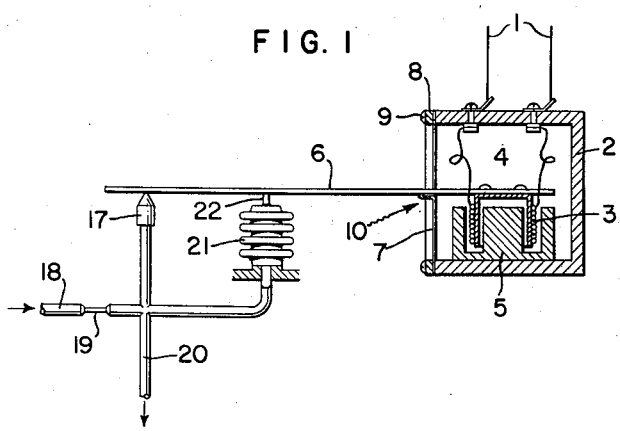
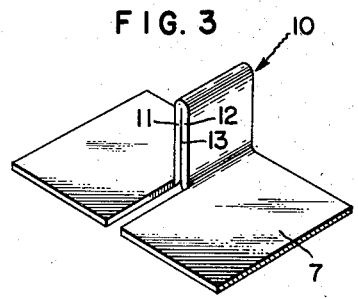
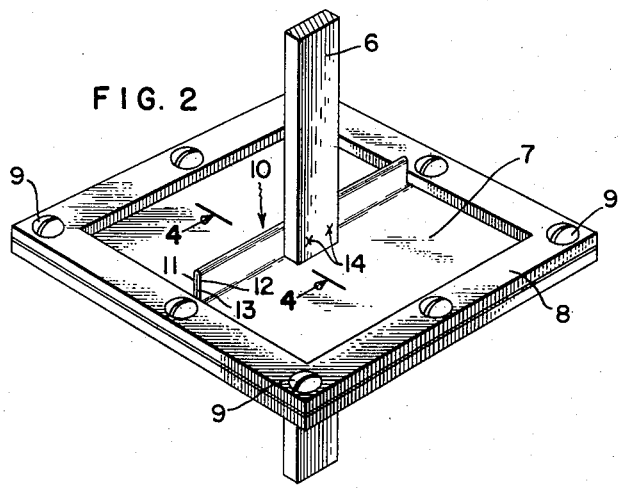
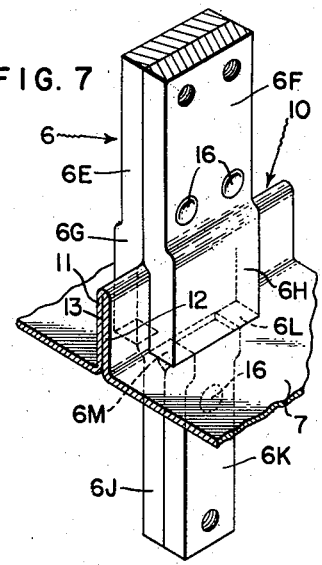
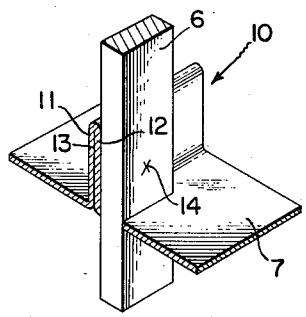
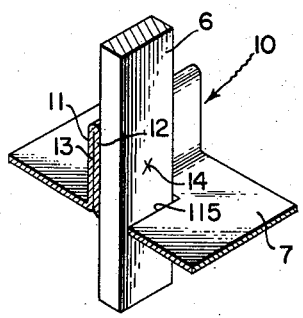
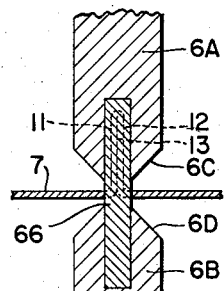
INVENTOR.
ROBERT J. WAGNER
BY Arthur H. Swanson
ATTORNEY United States Patent Office 2,897,678
Patented Aug. 4, 1959

2,897,678

FLEXIBLE SEAL AND PIVOT

Robert J. Wagner, Feasterville, Pa., assignor to Minneapolis-Honeywell Regulator Company, Minneapolis, Minn., a corporation of Delaware Application September 15, 1954, Serial No. 456,284

12 Claims. (Cl. 74—18.1)

One object of this invention is to provide means for transmitting motion through a partition or wall which may form the wall of a casing.

More specifically, it is an object of this invention to provide a combined pivot and seal having substantially no friction and a low spring gradient. This pivot is of the limited rotation type which finds much use in instrument mechanisms.

It is a further object of this invention to provide a dust proof or air-tight casing one wall of which forms a combined pivot and seal. This pivot affords an axis of rotation which is located and maintained in exactly the desired position and permits rotation around its selected position without involving or offering any friction. This wall also forms a seal so that an element located in the case is protected from dust, magnetic particles, moisture, or other contaminant.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a diagrammatic showing with parts broken away in vertical cross section;

Fig. 2 is a perspective view with parts broken away in horizontal cross section;

Fig. 3 is a perspective view of a portion of the device on an enlarged scale. This view shows the left end of the web with the frame, shown in Fig. 2, omitted;

Fig. 4 is a perspective view in vertical cross section of a portion of the device. This view is taken on line 4—4 of Fig. 2 looking in the direction of the arrows;

Fig. 5 is a perspective view in vertical cross section similar to that of Fig. 4 but showing a modification;

Fig. 6 is a vertical cross section showing a second modification, and

Fig. 7 is a perspective view in vertical cross section showing a third modification.

There is a need for pivots which can be economically mass produced. Such pivots are particularly useful in industrial process controllers. Such controllers are actuated by a force which is necessarily small so that it does not impose any more load on the measuring element than is necessary. This small force is then amplified by the controller to provide the power necessary to drive the final control element, which is generally a valve of considerable size.

The basic idea is to provide a pivot comprising a number of elements combined in such a manner that proper application of force causes a pivot action. In other words, the pivot must have a low resistance to one degree of freedom, i.e. rotation about the selected axis of pivotation, combined with high resistance to other degrees of freedom.

In particular, for certain types of instrument work it is often highly desirable that the pivots used involve no friction in their operation and therefore no net change in final location of the pivoted member when the original force causing rotation is removed. Only certain types of pivots can meet the requirement of being frictionless, i.e. without involving the sliding of one component upon another. One type of such pivot is described in copending application for patent by Robert J. Wagner, Serial No. 433,669, filed June 1, 1954. The pivot described in the present application is of this same type in that it is frictionless and has a low spring gradient. In addition, this pivot is integrally combined with a seal which, for reasons mentioned later, is often desirable. Heretofore the combined application of a pivot and a sealing means resulted in the inferior performance of one or the other element. It is the purpose of this device to provide desirable characteristics of operation of both seal and pivot in a manner that uses a minimum number of parts and is adapted to low cost production.

A device as described can be made conveniently by providing a relatively thin sheet of hard material, e.g. metal, fiber, or hard plastic. Across the middle of such a sheet is provided a strip or web of similar material which may be part of the sheet or may be a separate strip attached thereto. The center section of this web can be rotated a limited amount with comparatively little resistance. There is thus provided a pivot action having an axis of rotation which is located substantially at the intersection of the thin sheet and the web. Now, if a beam is attached to the center section of the web, the beam is on a true pivot, i.e. the actual axis of pivoting remains substantially in the same location. When the web is moved it is natural that some material of the sheet is also moved adjacent to the inter-section. This can be done in practice even though the sheet is theoretically flat and rigid as the movement is small, but it is obvious that, if movement of the beam tends to cause portions of the sheet located at a distance from the inter-section of the sheet and the strip to move up and down, difficulties are encountered due to the great increase in the force required to move the beam, and hence the spring gradient of pivot is increased. This may defeat its purpose as a low gradient pivot. For this reason steps are taken in the design of the pivot member so as to minimize motion of the sheet itself. It will be seen in the accompanying drawings that portions of the beam passing through the sheet are kept as close to the inter-section as possible, or else are physically separated from the sheet. If the latter is done the seal may still be useful for sealing against dust but not for hermetic sealing.

Fig. 1 shows a controller including an electric-to-pneumatic transducer. The lead conductors 1 pass through one wall of a casing 2 and connect to a coil 3 which is mounted on a movable winding form 4 of non-magnetic material. Coil 3 cooperates with a stationary armature 5. Coil 3 and form 4 are mounted on one end of a beam 6 forming part of a combined pivot and seal. In order that the relative motion between coil 3 and armature 5 may be transmitted to the outside of casing 2, the beam 6 is mounted on a combined pivot and seal which is substantially frictionless and has a low spring gradient. By means of this combined pivot and seal the casing 2 may be sealed hermetically or air tight or, if desired, may be sealed against dust without being absolutely air tight.

This combined pivot and seal comprises the sheet or diaphragm 7 which is clamped at its edges against casing 2 by a frame 8 held in position by a number of screws 9. The diaphragm 7 may have an intermediate portion folded into a strip or web, generally indicated at 10, and formed of two walls 11 and 12. Walls 11 and 12 are cut away at their ends so that frame 8 can overlie a portion of the flat end surfaces of the diaphragm 7. The slot 13 between walls 11 and 12 may be sealed by solder or other convenient means, if an air tight seal is required. If desired, the web or strip 10 may be formed of material other than the walls 11 and 12 of diaphragm 7. In such a case, the web is secured to the diaphragm 7 by solder or other convenient means.

In the drawings, for the sake of clarity the diaphragm 7 is shown much thicker, relative to beam 6, than is actually the case. In actual practice a suitable thickness for the diaphragm 7 is one and one half thousandths of an inch (0.0015"). A suitable thickness for one half of beam 6 (as shown in Fig. 7) is three hundred and twelve ten thousandths of an inch (0.0312").

Fig. 4 shows that a portion of the diaphragm 7 may be cut away so that the beam 6 projects through the diaphragm 7 at the cut away portion thereof. The beam 6 may be secured to the vertical face of the wall 12 by solder 14 or other convenient means and may be secured to the vertical faces of the cut away portion of the diaphragm 7 by solder 15 or other convenient means.

Fig. 5 shows that the portion of web 7, which is cut away, as indicated at 115, to permit the beam 6 to pass through the diaphragm 7, may be sufficiently large so that the vertical edges of the portion 115 do not engage and are not attached to the vertical faces of the beam 6.

Fig. 6 shows a modification in which the beam, generally indicated at 6, is formed of two parts 6A and 6B having their adjacent faces beveled or cut away at an angle, as indicated at 6C and 6D. The two portions of the beam 6 are connected by a strip 66 soldered or otherwise secured in a notch in the confronting portions 6A and 6B.

Fig. 7 shows a modification in which the web formed by the walls 11 and 12 is rigidly clamped in a beam, generally indicated at 6, which is formed of two parts. The upper portions 6E and 6F have their ends bent, as indicated at 6G and 6H, so as to receive the web formed by walls 11 and 12 between the bent portions 6G and 6H. The lower portions 6J and 6K are narrower in their dimension parallel to the longer dimension of the web formed by walls 11 and 12 than are the portions 6E and 6F. Horizontal walls or shoulders 6L and 6M are formed by those portions of the ends of the upper portions 6E and 6F which do not merge with the lower portions 6J and 6K. The intermediate parts of the upper portions 6E and 6F and the upper ends of the lower portions 6J and 6K do merge or join. Rivets 16 secure the portions of beam 6 into a unitary whole.

Returning to Fig. 1, the free end of beam 6 acts as a valve or flapper and cooperates with a nozzle 17 connected to a supply of compressed air 18 by means of restriction 19.

Nozzle 17 is also connected through pipe 20 to a bellows 21, whose free end 22 bears on the underside of beam 6 and provides a followup motion.

The operation of the controller including this electric-to-pneumatic transducer is as follows. Direct current is applied through lead conductors 1 to coil 3. A variation in this current causes relative movement between coil 3 and stationary armature 5. This, in turn, causes beam 6 to rock about the pivot formed by web 10 and thereby to vary the air escaping from nozzle 17. This variation in the pressure of the air in nozzle 17 causes the free end 22 of bellows 21 to move beam 6 in the opposite direction and thereby reposition beam 6 in a new position dictated by the resultant of the forces applied to the beam 6. The air pressure in nozzle 17 and bellows 21 is also applied through pipe 20 to an indicator (not shown) or to a controller (not shown) or to a final control valve (not shown). The variations in the pressure in nozzle 17 thus form the output pressure of the transducer.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. A combined pivot and seal, including, a fixed member, a thin sheet having a portion attached to said member and a portion spaced from said member, a strip extending across one face of the sheet at the spaced portion thereof and secured thereto as to reinforce the sheet, and a beam more than twice as thick as said sheet passing through said sheet adjacent said strip and secured to said strip and spaced from said member, and means causing relative movement between said member and said beam while one of said elements is held stationary.

2. A combined pivot and seal, including, a fixed member, a thin sheet having a portion attached to said fixed member and a portion spaced therefrom, a strip of approximately twice the thickness of the sheet and extending across one face of the sheet at spaced portion thereof and secured thereto so as to reinforce the sheet, a beam more than twice as thick as said sheet passing through said sheet adjacent said strip and secured to said strip and spaced from said member, and means causing relative movement between said member and said beam while one of said elements is held stationary.

3. A combined pivot and seal, including, a stationary casing having a diaphragm forming a wall of said casing and secured thereto at the rim of the diaphragm and having its intermediate portions spaced from said casing, a web formed of two thicknesses of the diaphragm at the spaced portion thereof crimped into confronting relationship, a rigid beam more than twice as thick as said web and passing through said diaphragm and attached to said web and adapted to turn about said web as a pivot and spaced from said casing.

4. A combined pivot and seal, including, a thick member, a sheet of thin material having a portion secured to said member and a portion spaced therefrom, a web extending across said sheet of material at the spaced portion thereof and comprising the thickness thereof folded up into two adjacent walls, a rigid beam more than twice as thick as said sheet passing through said sheet adjacent said web and connected to at least one wall of said web and spaced from said member, and means causing relative movement between said member and said web while one of said elements is held stationary.

5. A combined pivot and seal, including, a thick member, a thin diaphragm having a portion secured to said member and a portion spaced therefrom, a web formed of two thicknesses of said diaphragm at the spaced portion thereof and folded up on confronting walls, a relatively rigid beam passing through an opening having edges in a flat surface of said diaphragm and spaced from at least one edge of said opening and secured to said web and spaced from said member, and means causing relative between said member and said beam while the other said element is held stationary.

6. A combined pivot and seal, including, a thick member, a thin diaphragm having a portion attached to said member and a portion spaced therefrom and having part of said spaced portion cut away to provide an opening through said diaphragm, a web comprising two confronting walls each formed of a thickness of said diaphragm at the spaced portion thereof, a relatively rigid beam comprising two thick portions having their ends beveled adjacent said diaphragm and a thin portion passing through the hole in said diaphragm and secured in the ends of said thick portions adjacent the beveled edges and spaced from said member, and means causing relative movement between said member and said beam while one of said elements is held stationary.

7. A combined pivot and seal, including, a thick member, a diaphragm of thin sheet material having a portion thereof secured to said member and a portion thereof spaced therefrom, a web formed of two thicknesses of said sheet material at the detached portion thereof and folded out of the plane of said sheet material into confronting walls, a relatively rigid beam comprising two strips of thick material secured together and each having an intermediate portion spaced from the other and embracing said web between said spaced portion and spaced from said member, and means causing relative motion between said member and said beam while one of said elements is held stationary.

8. A pivot structure, including, a stationary thick frame, a thin sheet having its perimeter connected to and supported by said frame and having its center portion spaced from said frame, a strip thicker than said sheet and thinner than said frame and connected to and extending across the face of said sheet at the spaced portion thereof to reinforce it, and a beam more than twice as thick as said sheet or said strip and passing through said sheet and connected to said strip and spaced from said frame so as to be pivoted for location about an axis extending along said strip.

9. A pivot structure, including, a stationary thick frame, a thin sheet having its perimeter connected to and supported by said frame and having the central portion spaced from said frame, a strip thinner than said frame and connected to and extending across the face of said sheet at the spaced portion thereof to reinforce it, and a beam more than twice as thick as said sheet or said strip and passing through said sheet and connected to at least one face of said strip and spaced from said frame so as to be pivoted for rotation about an axis extending along said strip.

10. A means for transmitting a motion from an enclosed structure, including, a stationary frame, a thin diaphragm having the rim portion thereof secured to the frame and the central portion spaced from the frame and located at or near the same level as the line of engagement between the rim and the frame, a web comprising two confronting walls each formed of a thickness of said diaphragm and spanning the diaphragm and having connection to the central portion thereof to resist flexure of the diaphragm, and a rigid beam passing through said diaphragm and secured to said web and spaced from said frame so as to be pivoted for rotation about an axis extending along said web.

11. In mechanism for transmitting motion through a partition having an opening therethrough, the combination including, a flexible thin-walled diaphragm secured at its rim to said partition and covering the opening therein, a web formed of a fold of two of the walls of said diaphragm and extending across the opening in said partition and spaced from said partition, and a rigid beam extending through said diaphragm and spaced from said partition and secured to said web so as to pivot about an axis extending along said web.

12. A combined pivot and seal, including, a thick member, a diaphragm of thin sheet material having a portion thereof secured to said member and a portion thereof spaced therefrom, a web formed of two thicknesses of said sheet material at the spaced portion thereof and folded out of the plane of said sheet material into confronting walls, a relatively rigid beam passing through said diaphragm and comprising two strips of thick material secured together and each having an intermediate portion spaced from the other and embracing said web between said spaced portions and spaced from said member and having at least one shoulder thereon adapted to engage a flat face of said diaphragm.

References Cited in the file of this patent

UNITED STATES PATENTS

| | | |
|---|---|---|
| 1,148,227 | Heeley | July 27, 1915 |
| 2,004,417 | Penn | June 11, 1935 |
| 2,305,505 | Wagner | Dec. 15, 1942 |
| 2,367,087 | Beecher | Jan. 9, 1945 |
| 2,781,665 | Li | Feb. 19, 1957 |